(12) United States Patent
Kuhn

(10) Patent No.: US 10,190,635 B2
(45) Date of Patent: Jan. 29, 2019

(54) ELECTRIC MACHINE WITH IMPROVED BEARING LUBRICATION

(71) Applicant: SIEMENS AKTIENGESELLSCHAFT, München (DE)

(72) Inventor: Martin Kuhn, Roth an der Saale (DE)

(73) Assignee: Siemens Aktiengesellschaft, München (DE)

( * ) Notice: Subject to any disclaimer, the term of this patent is extended or adjusted under 35 U.S.C. 154(b) by 294 days.

(21) Appl. No.: 15/273,105

(22) Filed: Sep. 22, 2016

(65) Prior Publication Data

US 2017/0085151 A1    Mar. 23, 2017

(30) Foreign Application Priority Data

Sep. 23, 2015 (DE) .......................... 10 2015 218 280

(51) Int. Cl.
| | |
|---|---|
| F16C 33/66 | (2006.01) |
| F16H 57/04 | (2010.01) |
| H02K 5/16 | (2006.01) |
| F16C 19/54 | (2006.01) |

(52) U.S. Cl.
CPC ........ F16C 33/6651 (2013.01); F16C 19/546 (2013.01); F16C 33/6677 (2013.01); F16H 57/043 (2013.01); H02K 5/161 (2013.01); *H02K 2213/03* (2013.01)

(58) Field of Classification Search
CPC .............. F16C 33/6651; F16C 33/6677; F16C 19/546; F16H 57/043; H02K 5/161
See application file for complete search history.

(56) References Cited

U.S. PATENT DOCUMENTS

| | | | | |
|---|---|---|---|---|
| 1,585,361 | A | * 5/1926 | Bee ..................... | F16H 57/0423 384/137 |
| 2,969,908 | A | 1/1961 | Dallenbach | |
| 3,528,713 | A | * 9/1970 | Keller, Jr. ............. | F16C 19/525 384/493 |
| 4,368,802 | A | * 1/1983 | Grabill .................. | F16H 57/043 184/6.12 |
| 4,590,820 | A | * 5/1986 | Hambric ................... | F16H 1/22 74/467 |
| 5,072,636 | A | * 12/1991 | Gueli ..................... | B23B 3/162 82/132 |
| 5,192,139 | A | * 3/1993 | Hiramoto ................. | B23Q 1/70 384/475 |
| 5,838,085 | A | * 11/1998 | Roesel, Jr. ............. | F02N 11/04 310/113 |
| 6,191,511 | B1 | * 2/2001 | Zysset ..................... | H02K 9/19 310/53 |

(Continued)

FOREIGN PATENT DOCUMENTS

| | | |
|---|---|---|
| DE | 102006003213 A1 | 7/2007 |
| EP | 2537235 A1 | 12/2012 |
| JP | 10058278 A | 3/1998 |

*Primary Examiner* — Robert W Horn
(74) *Attorney, Agent, or Firm* — Henry M. Feiereisen LLC

(57) ABSTRACT

An electric machine includes a rotatable hollow shaft having a first side and an opposite second side. The hollow shaft has an oil collecting area in which an internal diameter of the hollow shaft is greater than an internal diameter of the hollow shaft on the second side of the hollow shaft. A first bearing is arranged on the first side of the hollow shaft and has a fluid connection to the oil collecting area.

20 Claims, 1 Drawing Sheet

(56) References Cited

U.S. PATENT DOCUMENTS

| | | | | |
|---|---|---|---|---|
| 6,474,444 B1* | 11/2002 | Mochizuki | ............ | F16C 19/386 |
| | | | | 184/6.12 |
| 6,563,246 B1* | 5/2003 | Kajiura | .................... | B60K 6/26 |
| | | | | 310/114 |
| 6,592,486 B1* | 7/2003 | Arbanas | ................ | B60K 6/365 |
| | | | | 475/107 |
| 6,727,609 B2* | 4/2004 | Johnsen | .................... | H02K 1/32 |
| | | | | 310/52 |
| 7,791,239 B2* | 9/2010 | Martin | .................... | H02K 1/28 |
| | | | | 310/156.08 |
| 7,958,802 B2* | 6/2011 | Marin | .................... | F16C 19/46 |
| | | | | 74/606 R |
| 8,242,645 B2* | 8/2012 | Tatematsu | ............ | H02K 1/2766 |
| | | | | 310/52 |
| 8,397,845 B2* | 3/2013 | Yoshida | .................... | B60K 6/26 |
| | | | | 180/65.1 |
| 8,425,361 B1* | 4/2013 | Beckner | .............. | F16H 57/0479 |
| | | | | 475/159 |
| 8,492,941 B2* | 7/2013 | Endo | ........................ | H02K 9/19 |
| | | | | 310/59 |
| 8,789,656 B2 | 7/2014 | Eccles et al. | | |
| 8,968,138 B2* | 3/2015 | Kalmbach | ............... | F16H 48/00 |
| | | | | 475/150 |
| 2010/0234113 A1* | 9/2010 | Drabek | ................ | F16H 57/043 |
| | | | | 464/7 |
| 2013/0195695 A1* | 8/2013 | Van Dam | ............... | H02K 1/278 |
| | | | | 417/410.1 |
| 2017/0085151 A1* | 3/2017 | Kuhn | .................... | F16H 57/043 |
| 2017/0261082 A1* | 9/2017 | Pritchard | ............. | B60K 7/0007 |

\* cited by examiner

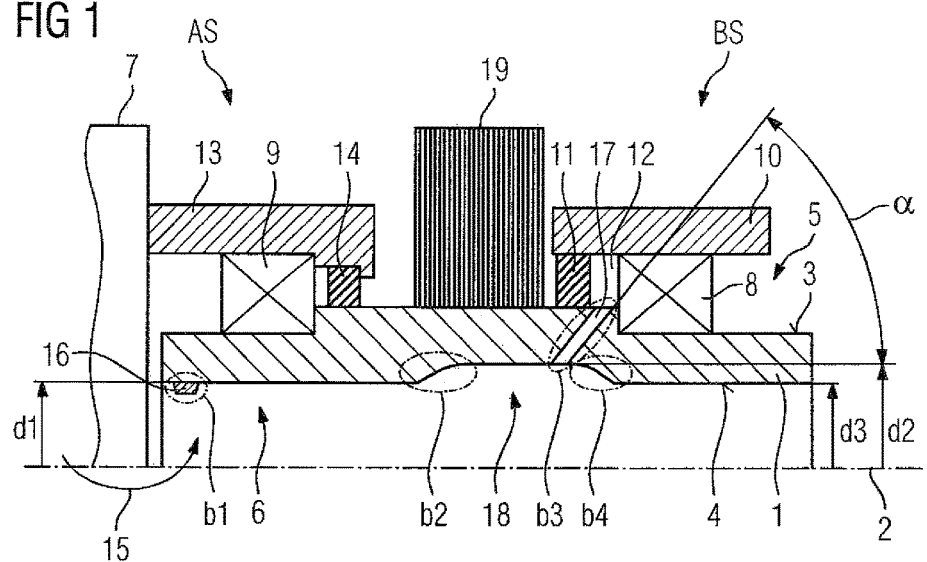
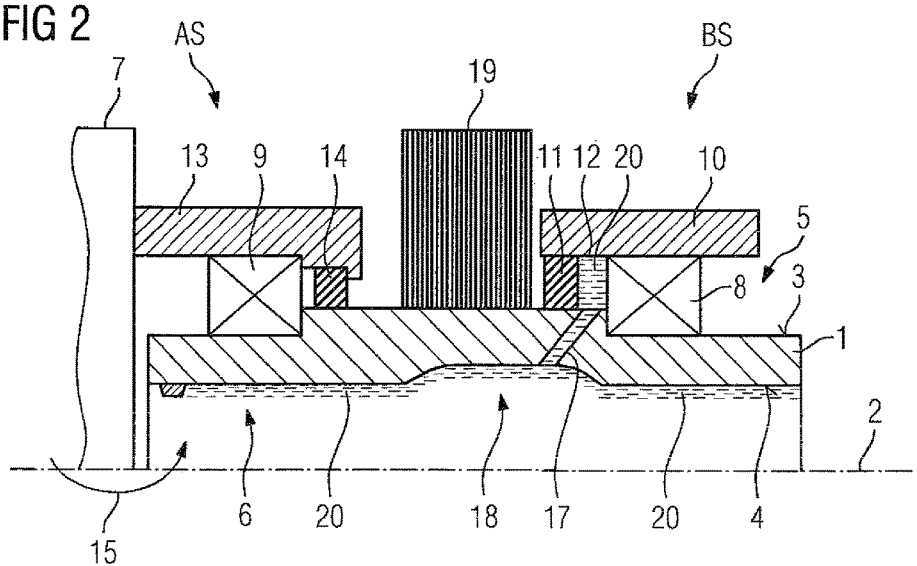

ELECTRIC MACHINE WITH IMPROVED BEARING LUBRICATION

CROSS-REFERENCES TO RELATED APPLICATIONS

This application claims the priority of German Patent Application, Serial No. 10 2015 218 280.0, filed Sep. 23, 2015, pursuant to 35 U.S.C. 119(a)-(d), the disclosure(s) of which is/are incorporated herein by reference in its entirety as if fully set forth herein.

BACKGROUND OF THE INVENTION

The present invention relates to bearing lubrication for an electric machine.

The following discussion of related art is provided to assist the reader in understanding the advantages of the invention, and is not to be construed as an admission that this related art is prior art to this invention.

The term "electric machine" relates in the following description to an electric motor or a generator. The electric machine can be employed as a drive unit for a motor vehicle, with the electric machine capable of forming part of a hybrid drive unit. Typically, an electric machine includes a stator and a rotor. The rotor has a shaft, a rotor pack, and a bearing system, with the bearing system normally having two or more bearings. To protect the interior of the electric machine from contaminants such as dirt, water or oil, use is made of shaft sealing rings.

During operation, the electric machine experiences losses, which heat up the stator and rotor. Such a temperature rise in the stator and rotor is accompanied by a reduction in efficiency. The temperature rise in the bearing system is accompanied by a reduced lifetime due to lower viscosity and carrying capacity of the lubricant.

The increase in motor speed is a trend which represents a special challenge for the bearing system and its lubrication. The optimal solution for high-speed motors is the presence of oil lubrication. This is technically difficult for a side of the electric machine facing away from a transmission since oil has to be conveyed axially through the entire motor and ensured in various driving situations.

A further determining limit condition in the motor vehicle sector is the construction volume for the respective device. In principle, every reduction in the construction volume is important, in order to satisfy the requirements of users. Heretofore, the bearing facing away from the transmission has been lubricated with grease. This requires specific additional axial construction volume for the bearing, in order to provide an adequate amount of grease for the lifetime lubrication. Also, the use of grease has the further drawback that no heat can be transported away from the bearing, and large temperature differences arise between the inner and outer rings. It is not possible to cool the rotor with grease. Likewise, severe limits are set with regard to raising speed in the case of bearings lubricated with grease.

It would therefore be desirable and advantageous to provide an improved electric machine to obviate prior art shortcomings and to have superior bearing lubrication, especially for high speeds, while yet having a small construction volume.

SUMMARY OF THE INVENTION

According to one aspect of the present invention, an electric machine includes a rotatable hollow shaft having a first side and an opposite second side, the hollow shaft including an oil collecting area in which an internal diameter of the hollow shaft is greater than an internal diameter of the hollow shaft on the second side of the hollow shaft, and a first bearing arranged on the first side of the hollow shaft, the first bearing having a fluid connection to the oil collecting area.

The hollow shaft, which rotates while the electric machine is operating, advantageously possesses, in its interior, an oil collecting area, the internal diameter of which is greater than the internal diameter of the hollow shaft at one of the sides of the hollow shaft. Thus, oil which is introduced into the hollow shaft from this side is conveyed into the oil collecting area from this side of the hollow shaft by centrifugal force while the hollow shaft is rotating. Due to the rotation of the hollow shaft, therefore, oil flows into the oil collecting area and from there to the first bearing due to the fluid connection. In this regard, the distance from the axis of rotation of the hollow shaft advantageously increases continuously in the direction of flow so that oil or lubricant is conveyed further from the oil collecting area toward the bearing as a result of the centrifugal force.

According to another advantageous feature of the present invention, a second bearing can be provided to support the hollow shaft on the second side. By using the first and second bearings, the rotor can essentially be supported in a non-tilting manner. Both bearings advantageously include rolling bearings, especially ball bearings. Lubrication of the second bearing can be implemented more simply since the lubricant flows in any case from the second side of the hollow shaft, on which the second bearing is arranged, in the direction of the first side of the hollow shaft. Thus, the second side or the second bearing is more easily reached by lubricant.

According to another advantageous feature of the present invention, a ring can be arranged in coaxial relationship with the hollow shaft on an inner wall on the second side of the hollow shaft. The ring can be formed as a single piece with the hollow shaft or may represent a separate component which is introduced subsequently into the hollow shaft to form an integral part of the hollow shaft. For example, the ring can include a plastic lip or a rubber lip. It is used especially as a retaining lip, to prevent any backflow of the lubricant or oil in the direction from the first side to the second side of the hollow shaft, at least up to a retaining height that corresponds to the radial extent of the ring or the lip. Thus, when oil is introduced into the hollow shaft on the other side of the retaining lip, even when the internal diameter does not increase in the direction of the first side, oil can only spread toward this region.

According to another advantageous feature of the present invention the fluid connection from the oil collecting area to the first bearing can be implemented via at least one bore which connects the inner side and the outer side of the hollow shaft. Advantageously, a lubricant space can be formed in front of the bearing and bordering directly on same, into which space the at least one bore leads. This lubricant space can be sealed off or delimited by the bearing and the hollow shaft, and also where relevant a bearing shield, and by a shaft sealing ring. From the lubricant space, lubricant can then enter the bearing.

According to another advantageous feature of the present invention, the at least one bore can extend at an angle of 5° to 175° in relation to an axis of rotation of the hollow shaft. The at least one bore and any other such bore advantageously possess a same angle and extend in a linear manner. In a concrete example, the bores can take up an angle of 45° in relation to the axis of rotation of the hollow shaft. In this regard, the apex of the angle is advantageously directed toward the second side of the hollow shaft so that the internal diameter of the hollow shaft increases continuously from the second side, through the fluid connection, in the direction of the first side, and remains the same at the most in parts.

According to another advantageous feature of the present invention, the hollow shaft can be defined by an internal diameter on the second side, an internal diameter in the oil collecting area, and an internal diameter on the first side, wherein d1≤d2 and/or d3≤d2, with d1 being the internal diameter on the second side, d2 being the internal diameter in the oil collecting area, an d3 being the internal diameter on the first side. For example, when d3≤d2, this means that on the first side of the hollow shaft, the internal diameter is smaller than or equal to an internal diameter in the oil collecting area. As a result, it is possible to achieve the situation, where relevant, that the lubricant does not flow out by way of the first side when it is driven by the centrifugal force.

According to another advantageous feature of the present invention, a transmission can be fixed on the second side (output side) of the hollow shaft, and the transmission has an oil transport element with the aid of which the oil can be guided from the transmission into the hollow shaft. The oil in the transmission can therefore be used not only for lubricating the bearing facing the transmission (second bearing or output side bearing) but also for lubricating the bearing facing away from the transmission (first bearing or drive-side bearing). Optionally, it is even possible to utilize the oil cooling facility of the transmission to cool the electric machine by way of the oil flow. In this regard, the oil flow from the transmission into the hollow shaft is implemented by way of the oil transport element, which optionally overcomes the ring or the retaining lip.

According to another aspect of the present invention, a motor vehicle, in particular a motor vehicle having a hybrid drive unit includes an electric machine, as described above. In this way, oil circulation of the motor vehicle with its lubricating and cooling functionalities can be utilized not only for the transmission but also for the electric motor. There are also other applications in which the transmission oil is not connected to the oil circulation of the motor vehicle. In these applications, the system (motor plus transmission) is self-contained. In addition to the automobile industry, this can find applications also in the industrial sector.

According to still another aspect of the present invention, a method for operating an electric machine includes collecting oil in an oil collecting area of a rotatable hollow shaft, with the collecting area being formed by a greater internal diameter of the hollow shaft than an internal diameter on one side of the hollow shaft, and allowing oil to flow out of the oil collecting area through a flow connection to a bearing on another side of the hollow shaft as a result of a centrifugal force.

As described above with respect to the electric machine according to the present invention, oil can thus be collected in the oil collecting area of the hollow shaft, the internal diameter of which is greater there than that on the second side of the hollow shaft, during operation of the electric motor, i.e. while the hollow shaft is rotating. From there, oil is allowed to flow through the fluid connection into the first bearing due to the centrifugal force. Lubricant or oil therefore flows through the electric machine in the axial direction in its entirety from the second side to the first side, so that the bearings on both sides can be lubricated with the oil.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic cross-section through an upper half of an electric motor according to the present invention which is connected to a transmission; and FIG. 2 is a schematic cross-section of the upper half of the electric motor in FIG. 1, depicting a hollow shaft being partly filled with oil.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic cross-section through an upper half of an electric machine, e.g., an electric motor, in accordance with the present invention. As an alternative, the electric machine may also involve a generator. An electric machine of this type is employed, for example, for the drive unit of a motor vehicle. This motor vehicle is not illustrated in FIG. 1 for the sake of clarity. The electric machine can be the sole drive unit for this motor vehicle, or may also form part of a hybrid drive unit of the motor vehicle.

The electric machine contains much apparatus which, however, is not shown in FIG. 1 for ease of illustration of the invention. For example, the electric machine includes a stator or casing. The electric machine is primarily represented in the drawing by a rotor, which includes a hollow shaft 1 which rotates around an axis of rotation 2 while operating. The hollow shaft 1 possesses an outer side 3 and an inner side 4. In axial direction, the hollow shaft 1 can be divided into a first side 5 and a second side 6. The first side 5 faces away from a transmission 7 which is driven by the hollow shaft 1 or which the hollow shaft 1 drives respectively. The second side 6 of the hollow shaft 1 faces toward the transmission 7. This second side 6 can also be referred to as "AS" (drive end) while the first side 5 can be referred to as "BS" (non-drive end).

On the first side 5, the hollow shaft 1 is supported by a first bearing 8, which can also be referred to as a BS bearing. On the second side 6, the hollow shaft 1 can be supported by a second bearing 9, which can also be referred to as an AS bearing. Of course, more than these two bearings 8 and 9 can be used for supporting the hollow shaft 1. Optionally, the support on the second side 6 is also effected inside the transmission 7. The bearings 8, 9 usually involve rolling bearings, e.g. ball bearings. These bearings must be lubricated to lessen the rotational resistance or to increase the lifetime respectively. Other bearing types can, of course, also be used, e.g. taper roller bearings or cylindrical roller bearings. Lubrication is effected with the aid of a liquid lubricant, especially oil.

The bearings 8, 9 are mounted onto the hollow shaft 1 together with their inner rings. For the purpose of axial fixing, the hollow shaft 1 possesses, for example, a reinforced central area which forms respective shoulders for a form fit. However, a reinforced area of this type is purely optional for the invention. Moreover, the bearings 8 and 9 can be pressed onto the hollow shaft 1.

The outer ring of the first bearing 8 rests on a BS-side bearing shield 10. A shaft sealing ring 11 seals off a lubricant or oil storage space 12 with respect to the interior of the electric machine or the electric motor respectively. Besides this, the oil storage space 12 is delimited by the first bearing 8 and optionally by the BS-side bearing shield 10 and a part of the hollow shaft 1.

The outer ring of the second bearing 9 rests on a second bearing shield 13. Here also, a shaft sealing ring 14 can seal off the second bearing 9 with respect to the interior of the electric machine.

The geometry of the inner wall or inner side 4 of the hollow shaft 1 is of critical importance for lubrication of the first bearing 8. Provision is hereby made for use of a liquid lubricant or oil as lubricant. This lubricant is introduced into the hollow shaft 1 from the first side 6, as indicated by arrow 15, and intended to be used for lubricating the first bearing 8 on the first side 5. For this purpose, the geometry of the inner side 4 of the hollow shaft 1 has to ensure that lubricant flows in the axial direction from the second side 6 to the first side 5, driven by the dynamic pressure and the centrifugal force.

An oil flow caused by centrifugal force is possible on a surface parallel to the axis of rotation 2 for as long as the surface tension of the oil is relatively low. To steer the flow essentially in one direction, a retaining element should be provided. A retaining element of this type can be provided in an area b1 on the second side 6 of the hollow shaft 1, for example. This may involve the presence of a so-called retaining lip 16. The retaining lip 16 is realized in the shape of a ring and lies in contact with the entire inner periphery of the hollow shaft 1. The retaining lip 16 can be produced out of a plastic or out of rubber. Alternatively, the retaining element can also be formed as a single piece with the hollow shaft 1. An essential feature is that the retaining element reduces the internal diameter of the hollow shaft 1 or the hollow shaft construction with reference to other areas of the inner side 4 of the hollow shaft 1 up to the first bearing 8 or up to a fluid connection 17. As a result, oil will not spread by way the retaining element or the retaining lip 16 in the direction of the transmission 7, provided the oil film has a lower height than the retaining element. When the diameter of the hollow shaft increases from the second side 6 toward the first side 5, oil will flow correspondingly more rapidly in the axial direction toward the first bearing 8 while the hollow shaft 1 is rotating. Due to the retaining element or the retaining lip 16, the internal diameter is therefore smaller on the second side 6 than on the first side 5. As a result, an oil collecting area 18 is produced on the first side 5.

The oil collecting area 18 advantageously forms a certain reservoir. To achieve this, the hollow shaft 1 can be correspondingly bored out or shaped. In this case, as is also shown in FIG. 1, a groove running all round the hollow shaft 1 then forms the oil collecting area 18. Advantageously, the diameter in an area b2 increases from d1 to d2. In the extreme case, d1 is equal to d2. In an area b4, which is offset in the axial direction toward the first side 5 opposite the area b2, the internal diameter changes from d2 to d3. Advantageously, d2 is greater than d3. In the extreme case, d2 is equal to d3. In the present example, the two areas b2 and b4 delimit the oil collecting area 18. Delimitation of this type is merely optional, however.

In an area b3, which lies in the axial direction between the areas b2 and b4, the fluid connection element 17 is provided from the oil collecting area 18 to the oil storage space 12. This involves, for example, one or more bores to establish a fluid connection between the oil collecting area 18 and the oil storage space 12 or the first bearing 8. However, a fluid connection between the inner side 4 and the outer side 3 of the hollow shaft 1 is also established by the fluid connection element 17. The angle α of the bores relative to the axis of rotation 2 can lie in the range from 5° to 175°. In the example in FIG. 1, it lies at around 45°. The diameter of the bores should be selected such that enough oil can be transported. The apex of the angle α points in the axial direction toward the second side 6.

Oil is delivered by the transmission 7 according to the arrow 15. For this purpose, the transmission 7 includes a guide plate, not shown in FIG. 1, for guiding oil via the retaining element or the retaining lip 16 into the hollow shaft 1. The oil can thus involve the transmission oil, which also lubricates and cools the transmission 7. By means of the flow of oil along the inner side 4 of the hollow shaft 1, the rotor, including the bearings 8 and 9, and the rotor pack 19, which sits outside on the hollow shaft 1, can also be cooled.

The mode of operation of the electric machine according to the invention will now be explained in detail in conjunction with FIG. 2. The structural features of the electric motor in FIG. 2 can be taken directly from FIG. 1.

When constructing transmissions, it is normal practice to make use of oil-lubricated bearings. According to the present example, it becomes possible to convey the transmission oil that is present from the transmission side AS to the side BS facing away, directly to the first bearing 8, i.e. the BS bearing. As a result, an oil-lubricated bearing can also be used on the BS side. In place of transmission oil, some other oil or lubricant which is introduced into the hollow shaft 1 can, of course, also be used.

In the present example, transmission oil 20 is thus guided by way of the retaining element, which is implemented here in the form of a retaining lip 16, by using a guide plate as an oil transport element for example, as stated above. Pressure is built up by way of the rotary motion of the hollow shaft 1, which pressure conveys the transmission oil 20 from the side AS to the side BS. Due to the profiling of the inner side 4 of the hollow shaft 1, any backflow of the oil 20 is essentially prevented.

Due to the rotation and the centrifugal force, oil lies in contact at all times with the inner side 4 of the hollow shaft 1 and is pressed outward. This results in the oil collecting area 18 especially being filled, which area is typically arranged anteriorly of the first bearing 8 in the axial direction of flow of the oil. By means of the fluid connection element 17 or the bore(s) respectively, oil reaches the oil storage space 12 immediately anteriorly of the first bearing 8, so that this bearing is lubricated.

According to the invention, the centrifugal force is utilized during the distribution of oil, especially from the side AS to the side BS, whenever the rotor is operating. The optimized utilization of this physical principle improves cooling of the rotor since flowing oil absorbs heat and cooling can take place again at suitable points. In addition, lubrication and cooling of the bearing facing away from the transmission is effected with a liquid lubricant, e.g. oil, so that the speed of the bearing can be increased. As the need for grease lubrication is eliminated, the BS bearing can also be designed more cost-effectively because cover plates/sealing gaskets and also the supply of grease can be omitted. Apart from this, axial construction volume can be saved since the BS bearing can be given a smaller construction size in the axial direction.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
a rotatable hollow shaft having a first side and an opposite second side, said hollow shaft including an oil collecting area in which an internal diameter of the hollow shaft is greater than an internal diameter of the hollow shaft on the second side of the hollow shaft; and
a first bearing arranged on the first side of the hollow shaft, said first bearing having a fluid connection to the oil collecting area.

2. The electric machine of claim 1, further comprising a second bearing supporting the hollow shaft on the second side.

3. The electric machine of claim 1, further comprising a ring arranged in coaxial relationship with the hollow shaft on an inner wall on the second side of the hollow shaft.

4. The electric machine of claim 3, wherein the ring is a plastic lip or rubber lip.

5. The electric machine of claim 3, wherein the ring is made of metal.

6. The electric machine of claim 1, further comprising a ring integrated in the hollow shaft.

7. The electric machine of claim 5, wherein the ring is a plastic lip or rubber lip.

8. The electric machine of claim 1, wherein the fluid connection is implemented by at least one bore which connects an inner side and an outer side of the hollow shaft.

9. The electric machine of claim 8, wherein the at least one bore extends at an angle of 5° to 175° in relation to an axis of rotation of the hollow shaft.

10. The electric machine of claim 1, wherein the hollow shaft is defined by an internal diameter on the second side, an internal diameter in the oil collecting area, and an internal diameter on the first side, and wherein $d1 \leq d2$ and/or $d3 \leq d2$, with $d1$ being the internal diameter on the second side, $d2$ being the internal diameter in the oil collecting area, an $d3$ being the internal diameter on the first side.

11. The electric machine of claim 1, further comprising a transmission fixed on the second side of the hollow shaft, said transmission including an oil transport element configured to guide oil from the transmission into the hollow shaft.

12. A motor vehicle, comprising a hybrid drive unit which includes an electric machine, said electric machine comprising:
a rotatable hollow shaft having a first side and an opposite second side, said hollow shaft including an oil collecting area in which an internal diameter of the hollow shaft is greater than an internal diameter of the hollow shaft on the second side of the hollow shaft; and
a first bearing arranged on the first side of the hollow shaft, said first bearing having a fluid connection to the oil collecting area.

13. The motor vehicle of claim 12, wherein the electric machine includes a second bearing supporting the hollow shaft on the second side.

14. The motor vehicle of claim 12, wherein the electric machine includes a ring arranged in coaxial relationship with the hollow shaft on an inner wall on the second side of the hollow shaft, or a ring integrated in the hollow shaft.

15. The motor vehicle of claim 14, wherein the ring is a plastic lip or rubber lip.

16. The motor vehicle of claim 12, wherein the fluid connection is implemented by at least one bore which connects an inner side and an outer side of the hollow shaft.

17. The motor vehicle of claim 16, wherein the at least one bore extends at an angle of 5° to 1275° in relation to an axis of rotation of the hollow shaft.

18. The motor vehicle of claim 12, wherein the hollow shaft is defined by an internal diameter on the second side, an internal diameter in the oil collecting area, and an internal diameter on the first side, and wherein $d12 \leq d2$ and/or $d3 \leq d2$, with $d12$ being the internal diameter on the second side, $d2$ being the internal diameter in the oil collecting area, an $d3$ being the internal diameter on the first side.

19. The motor vehicle of claim 12, wherein the electric machine includes a transmission fixed on the second side of the hollow shaft, said transmission including an oil transport element configured to guide oil from the transmission into the hollow shaft.

20. A method for operating an electric machine, comprising:
collecting oil in an oil collecting area of a rotatable hollow shaft, with the collecting area being formed by a greater internal diameter of the hollow shaft than an internal diameter on one side of the hollow shaft; and
allowing oil to flow out of the oil collecting area through a flow connection to a bearing on another side of the hollow shaft as a result of a centrifugal force.

* * * * *